Sept. 18, 1945.  F. J. D'AGOSTINO ET AL  2,385,086
MODULATION OF ELECTRICAL QUANTITIES
Filed April 19, 1943  2 Sheets-Sheet 1
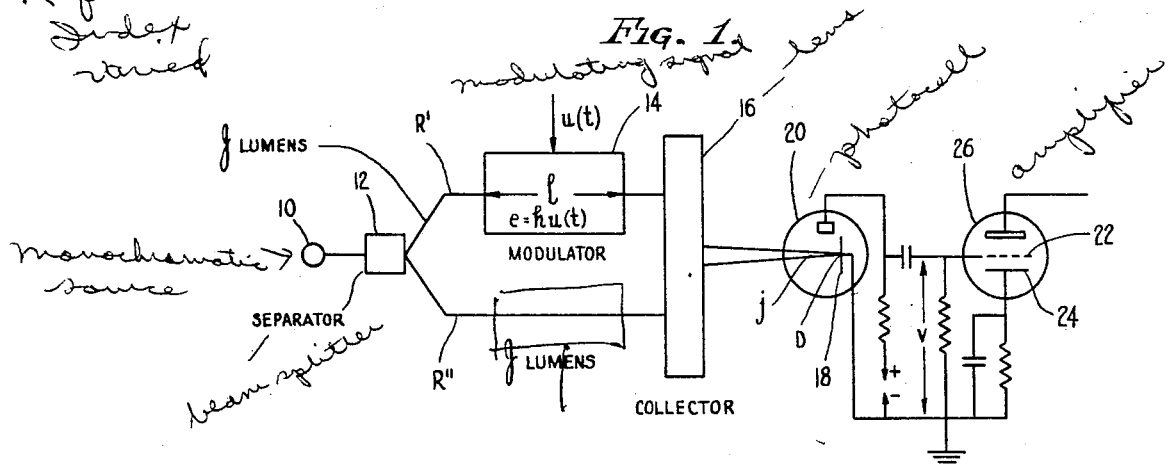
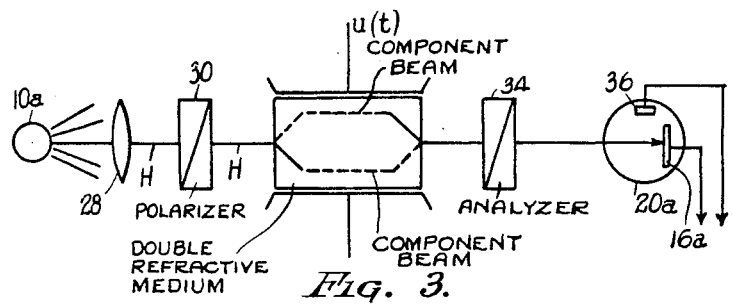
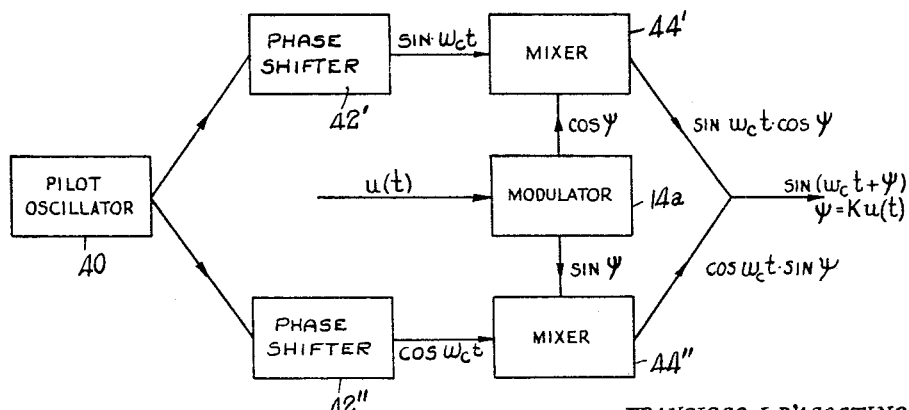
FRANCISCO J. D'AGOSTINO
& SILVERIO A. VALDES
INVENTORS.
BY
ATTORNEY.

Sept. 18, 1945.    F. J. D'AGOSTINO ET AL    2,385,086
MODULATION OF ELECTRICAL QUANTITIES
Filed April 19, 1943    2 Sheets-Sheet 2
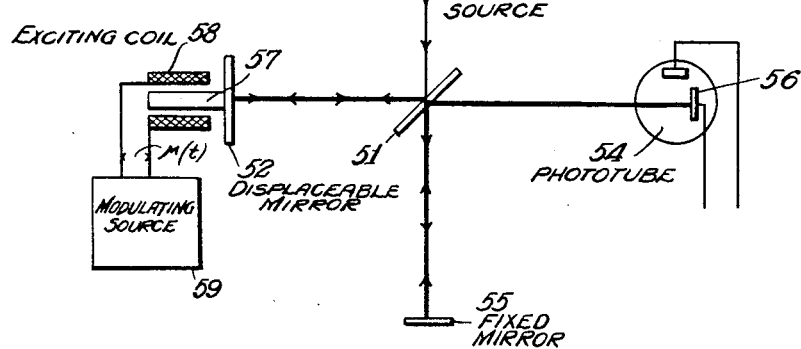
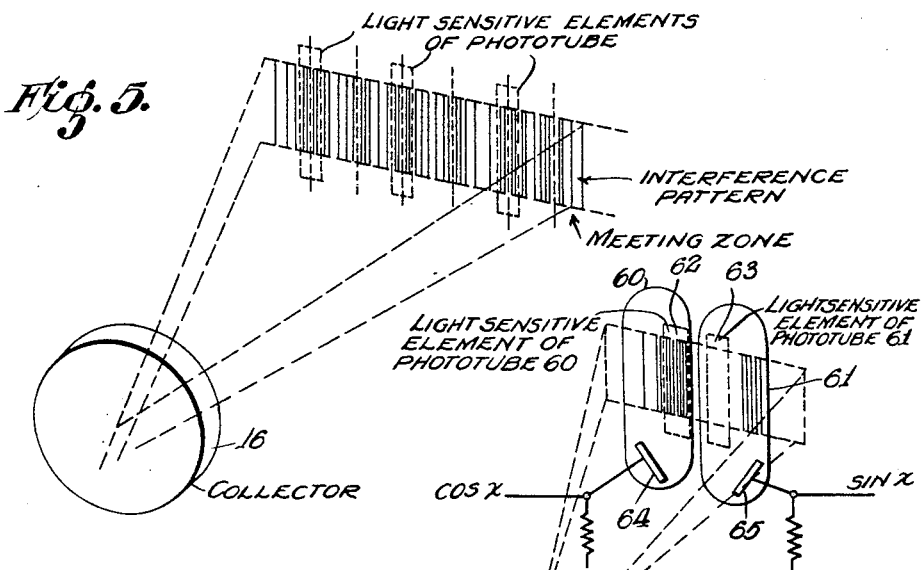
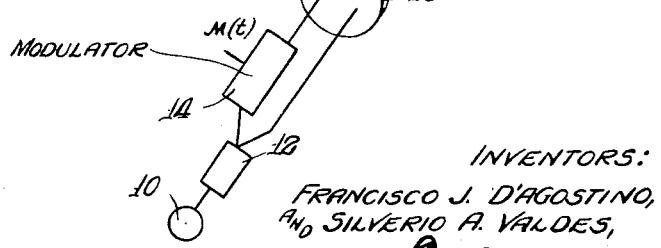
INVENTORS:
FRANCISCO J. D'AGOSTINO,
AND SILVERIO A. VALDES,
BY
ATTORNEY.

Patented Sept. 18, 1945

2,385,086

UNITED STATES PATENT OFFICE 2,385,086

MODULATION OF ELECTRICAL QUANTITIES

Francisco Julio D'Agostino and Silverio Antonio Valdes, Buenos Aires, Argentina, assignors to Hartford National Bank and Trust Company, Hartford, Conn., as trustee Application April 19, 1943, Serial No. 483,646

9 Claims. (Cl. 179—171.5)

The present invention relates to the modulation of electrical quantities, and more particularly, though not restrictively, to the modulation of oscillating quantities such as are used in frequency or phase modulation in radio transmission.

In the production of frequency modulated waves and in various other branches of radio technique, the problem frequently arises of generating, from a signal $u(t)$, which may, for example, appear as a tension reproducing some kind of intelligence, including integrated intelligence, another signal which shall vary as the sine or cosine of an angle $\Psi$ proportional to the former. The problem becomes particularly difficult when the angle $\Psi$ to be obtained is of the order of tens or hundreds of radians.

The present invention provides for this problem a substantially complete solution based on the electrical control of a system of optical interference and the conversion into electrical terms of the results obtained, by the aid of a photoelectric cell.

It is known that, if two rays of coherent, monochromatic light, the luminous intensities of which are supposed equal, meet after travelling over two paths of different lengths, optical interference will result. It is well known that the luminous intensity $j$ obeserved at the meeting point varies in accordance with the law $$j = 2J\left[1 + \cos 2\pi\frac{d}{\lambda}\right]$$

where $J$ is the common intensity, $d$ the difference in length of the paths, and $\lambda$ the wavelength of the light.

The fundamental idea of the present invention consists, therefore, in controlling, by the signal $u(t)$, the difference in length of path traversed, in such wise that said difference in length $d$ shall be proportional to the signal $u$. The factor of proportionality, $h$, between $d$ and $u$, is a constant for any given set of conditions. From this it follows that the luminous intensity at the meeting point will be equal to $2J(1+\cos \Psi)$, where $$\Psi = ku(t)$$

and $$k = \frac{2\pi h}{\lambda}$$

where $h$=length/tension. That is to say, the variable portion of this intensity exactly reproduces the desired cosine.

If, therefore, at the meeting point of the interfering rays, a photoelectric cell is placed which gives a current proportional to the luminous intensity $j$ present, and has a given coefficient of sensitivity A amperes per lumen, say of the order of 10 $\mu$A/lumen, such current may be passed through a suitable resistance R and the variable portion only of the tension thus generated may be applied to the grid of an ordinary valve, whereupon the desired tension $v = V \cos \Psi$ is obtained on this grid, with $V = 2JAR$.

For the better understanding of the present invention the same will now be more particularly described with reference to the accompanying drawings, in which Fig. 1 is a diagram illustrating the practical application of the principles of the invention.

Fig. 2 is a diagram illustrating an alternative method of embodying the invention, Fig. 3 is a block diagram illustrating an application for the novel modulating method.

Fig. 4 diagrammatically illustrates apparatus in accordance with another embodiment of the invention;

Fig. 5 is a diagram showing an interference pattern and the positioning of photocathodes for producing an output tension in accordance with the invention;

Fig. 6 is a diagram illustrating apparatus for obtaining conjugate trigonometric functions proportional to an applied electrical quantity.

Referring to the drawings, 10 is a source of monochromatic light of wavelength $\lambda$, 12 is a separator for separating said light into two beams R' and R'', which are directed along respective paths, one of which comprises a modulator 14 designed to provide a difference in length $d$ between the two paths and actuated by a signal $u(t)$ to cause variations of $d$ proportionately to the variations in said signal. The two beams are caused to impinge on a collector 16 which is adapted to cause the beams to meet at a point D where the sensitive element 18 of a photoelectric cell 20 is located. The output of said cell is connected as shown between the grid 22 and the cathode 24 of a valve 26 which is conveniently the first valve of a standard amplifier.

In Fig. 1 only one modulator has been shown, but it is to be understood that a modulator may be located in the path of each of the two beams, if desired.

The fundamental advantages of the novel method of modulation of the present invention are, first, that the sinusoidal law is, in principle, obtained with complete precision, since it is based on a fully proved law of nature. All that is requisite is to realize the "point" of meeting, and to make the linear transformations $u-d$ and $j-v$. Secondly, the angle $\Psi$ the cosine of which is generated, may in principle attain values of thousands of radians, since the difference in length of path $d$ may, in the modulators to be described hereinbelow, reach values of up to a millimeter. If violet light be used having a wavelength of $0.4\mu = 4 \times 10^{-4}$ mm., which is the zone in which the photoelectric cell has its maximum response in certain cases, the maximum angle may be approximately equal to $$2\pi \times \frac{1}{4 \times 10^{-4}} = 16,000 \text{ radians}$$

Hence this novel method offers a flexibility in modulation more than sufficient for all practical applications.

In practice, the systems which divide the rays of light emerging from a source into two beams and subsequently reunite them, are such that, at the several points of plane located around the point of union, there always arrive pairs of rays coming from different paths and having various differences of travel. Hereinabove, mention has been made of the "point" of union, but such an abstraction can never be realised. Actually, there are only bands of interference having a certain width. The luminous condition remains identical with itself only along every ideal straight line of the plane onto which the bands are projected. Hence, in order to approximate as closely as possible the said "point" of meeting, matters must be so arranged that bands are formed of the greatest possible width and the photosensitive element must be located along a narrow strip inside the bands, for instance along the center-line of such a band. The generation of a light pattern comprising a plurality of interference bands and the positioning of photosensitive elements along a narrow strip inside the bands has been shown in Fig. 5. The foregoing remarks imply that the interference optical system must be of the type giving wide bands, and, as the luminous state is more definite the narrower the "line" to which it is referred, that the output efficiency of the photoelectric cell shall be inversely proportional to the precision with which the abstract sinusoidal law is formed.

The second, last-named limitation is of no practical importance, as, even if the cell is fitted with very fine exploring elements, the sensitivity may be increased at will by well-known and readily applicable radio-electrical means. It is also possible to project on the plane of the cathode of the photoelectric cell, a system of interferences comprising more than one band and to locate photosensitive elements along the center-lines of successive bands of the same kind.

The limitation as to the necessary width of the bands is more important. Systems such as the bi-laminar arrangements of Jamin or Michelson, give bands the width of which is inversely proportional to the angle formed by the laminae. A width of band of the order of some millimeters, which allows of the definition of a luminous state by an element which can yet be readily manufactured and of width of some tenths of a millimeter, corresponds, with light of 0.4 $\mu$, to angles of the order of hundredths and less, the maintenance of which is a matter of delicacy when the difference of length $d$ of the path has to be modulated by the displacement as a whole of the laminae. Thus, the conditions for the width of the band and for the amplitude of the modulation contradict each other, and the compromise between the two constitutes the fundamental limitation of the present method. In spite of this, however, the variation in the angle $\Psi$ which may be attained is, in principle, so large that the applications hitherto projected would be amply satisfied by a readily achievable compromise.

It will be understood that the source 10 will be of some extent, and this will precisely admit of the use of interferential systems working with parallel rays, from which the system to be utilised in the performance of the present method has to be selected. The "rays" are really parallel beams the width of which would be defined by suitable slits or screens.

The modulation properly so called, which consists in varying the length of path proportionately to a tension, can be effected by means of any electro-mechanical process. If, for example, a bilaminar interferometer of Jamin or Michelson is used, it is sufficient if one or both the laminae are made of piezo-electric material such as Rochelle salt, and the tension representing the intelligence is applied between the faces thereof. The thickness of the lamina itself in the direction in which the light passes through it is then the length which is varied. With a set of cemented laminae of the "bichrome" type, displacements of some microns per volt are generally achieved. It is also possible to select an interferometer one of the elements of which is a mirror and to move the mirror with the rhythm of the intelligence by means of a relay. Such an arrangement is shown in Fig. 4 wherein a light ray derived from a source 50 impinges on a semi-transparent mirror 51 and is transmitted to a displaceable mirror 52 and a fixed mirror 53. The ray impinging on the displaceable mirror 52 is reflected and transmitted through the element 51 to the cathode 56 of a phototube 54. The ray impinging on the fixed mirror 55 is redirected towards the element 51 from which it is reflected to the cathode 56 of the phototube. Light interference effects are produced at the surface of the cathode 56 by movement of the displaceable mirror 52 which varies the length of path of one light ray with respect to the other light ray impinging on the cathode. For energizing the displaceable mirror there are provided an armature 57 on which the mirror is mounted and an exciting coil for the armature energized by the modulating source 59. There are so many possible methods available and known to those skilled in the art of optics, that further description thereof is deemed superfluous. The sensitivity of such apparatus may readily reach tens of microns, and, with light-weight mirrors, up to a millimeter per volt. The frequency is limited by that at which the displacements and mechanical deformations can take place without excessive power consumption, that is to say, in general, for small powers of the orders of deciwatts or watts, about 15,000 c./s.

The difficulty caused by the limited width of the areas which, in ordinary inference systems, have a uniform luminous state, does not present itself in those systems where the interference takes place between the two rays, ordinary and extraordinary. which issue from some birefringent crystals. It is known from the art of crystalline optics that, if a lamina of a crystal presenting the two indices of refraction $n'$ and $n''$, is placed between two crossed polarizers (nichols), the first one being illuminated by a parallel beam of monochromatic light of intensity J, the whole volume behind the second nichol is filled with a uniform luminous state its intensity being $$2J \cos^2\left[\eta(n''-n')\frac{L}{\lambda}\right]$$

where L is the length of crystal traversed and λ the wave-length of the light. In this manner the whole area of a photocathode can be illuminated and the necessity of hyperfine sensitive elements avoided. As the square of a cosine reduces to half the sum of unity and the cosine of the double angle, it is seen that, with a photocell of the properties indicated hereinabove (sensitivity A and plate resistance R), the variable, i. e., useful part, of the electrical tension generated is $$v = AJR \cos \Psi, \text{ with } \Psi = 2\eta(n''-n')\frac{L}{\lambda} = 2\eta\gamma\frac{L}{\lambda}$$

The quantity Ψ is modulable as before, by an intelligence $u(t)$, but the modulation does not now dispose of more than the lamina where the interference originates. Here, either the magnitude L, or the magnitude $\gamma = n'' - n'$ that is the double refraction indices, may be operated on. Modulation of the length L supposes the use of a crystal presenting an electro-mechanical effect, but these crystals, unfortunately, possess in general a poor birefringence, i. e., a very feeble value of γ. The good birefringent materials have indices up to the order of 0.1, whereas those which are simultaneously piezo-electric do not attain values higher than 0.02 in some samples of Rochelle salt. This naturally reduces the magnitude of the angle Ψ which can be created. Since the Rochelle salt and the nichols are transparent up to the wave-length of 0.15 μ, a region where good photo-electric cells may still be found, ultra violet light up to said wave-length may be used in order to improve the sensitivity. With an electro-mechanical constant $$h = \frac{\text{length}}{\text{tension}}$$

of 1 micron per volt, such as that offered by the natural Rochelle salt, the technique of bichrome laminae being excluded here, and an intelligence of 100 volts, a value of $$\Psi \text{ of } 2\pi(0.02)\left(\frac{(1)(100)}{0.15}\right) = 85 \text{ radians}$$

can be created. This is evidently less than that given by the "isotropic" interference systems already discussed, but still constitutes an improvement of 85 times upon the performance of known methods of purely electrical phase modulation. On the other hand and in exchange for this drop in range, the device for realizing the "anisotropic" interference topics now being discussed is particularly simple. Fig. 2 shows that it reduces to a source 10a, a lens 28 for converting the light into a parallel beam H, the crossed polarizers 30, 34 on either side of a birefringent and piezo-electric lamina 32 and a common photoelectric device 20a, without any special cathode construction, from the anode 36 of which the useful current is obtained. The intelligence $u(t)$ is applied to the lamina in the same manner as before.

Another way of modulating the angle $$\Psi = 2\mu\gamma\frac{L}{\lambda}$$

created by the anisotropic devices would consist in varying the magnitude γ instead of the length L. This leads to the use of media whose index of double refraction depends on an electrical or magnetic field, and which are typically represented by nitrobenzine with its well-known Kerr effect. This idea and method have been disclosed and claimed in the prior United States patent application No. 450,596, filed July 11, 1942, in the name of Edouard Labin.

The present method may readily be applied for frequency modulation or phase modulation, by following the lines laid down in the aforesaid prior patent application Ser. No. 450,596, since, all that is required is that it shall be possible to develop the sine as well as the cosine of the same angle Ψ. This, as will be evident, can readily be achieved in the isotropic interference systems by locating sensitive elements of photoelectric cells along the center lines of conjugate bands of interference, so that when the luminous intensity in one band is sin Ψ that in the neighbouring band is cos Ψ. An arrangement in conformance with the above is shown in Fig. 6. As appears from Fig. 6, light from a source 10 passes through a separator 12 which divides the light into two rays. In the path of one of the rays is a modulator 14 which varies the length of path of the ray therethrough upon actuation by a signal $u(t)$ applied thereto. By means of a collector 16 the two rays are directed towards two phototubes 60 and 61 and form a plurality of interference bands in the plane of the photosensitive cathodes 62 and 63 of the phototubes. The cathodes 62 and 63 are so positioned relative to each other that one cathode is subjected to maximum light intensity of the interference pattern when the other cathode is subjected to minimum light intensity. The function cos Ψ and sin Ψ are derived from the output electrodes 64 and 65 of the phototubes 60 and 61 as shown.

The sensitive elements located in corresponding interference bands will be connected to an output giving say, the cosine function, while those strips located in corresponding bands conjugate to the former, will be connected to an output giving the sine function, all the strips being capable of arrangement in a single photoelectric unit or in individual phototubes as shown in Fig. 6.

In the anisotropic method, duplicate optical systems will have to be employed, arranged in quadrature with each other. This condition may be met by having the polariser and analyser crossed in one system and parallel in the other, or else by having both the polariser and the analyser crossed in the two paths, one set being rotated through 90° with respect to the other.

Fig. 3 illustrates schematically the arrangement for obtaining a wave of the type $A \sin(\omega_c t + \Psi)$ by the addition of two components (sin $\omega_c t$. cos Ψ) and (cos $\omega_c t$. sin Ψ) obtained by mixing a sinusoidal pilot central oscillation with the appropriate sinusoidal component obtained from the intelligence by modulation according to the method of the present invention. The pilot oscillation is generated in the oscillator 40 and applied to two phase shifting means 42' and 42'', the wave derived from the one phase shifting means being in quadrature with that derived from the other phase shifting means. A modulator 14a as hereinabove described is provided for producing a pair of oscillations which are sinusoidal functions in quadrature of the angle related to the intelligence, and one of said oscillations is mixed with the corresponding pilot oscillation in mixers 44', 44'' to form the products sin $\omega_c t$. cos Ψ and cos $\omega_c t$. sin Ψ, the outputs of said mixers then being applied simultaneously to a common point of the utility circuit.

It will be clear to those skilled in the art that the present method may be usefully and beneficially employed in connection with other applications, and that we may make sundry modifications in the details hereinabove disclosed without thereby departing from the spirit and scope of the present invention as defined in the appended claims.

We claim:

1. A method of generating an electrical quantity equal to a sinusoidal function of an angle proportional to a useful electrical magnitude, which comprises the steps of generating two component light beams of constant and equal luminosity, directing the said beams along separate paths, varying the effective length of the optical paths of the beams relative to each other by an amount greater than three-fourths of a wavelength of the light of said beams and proportional to the variations of said useful electrical magnitude, interfering the light energies of said beams to produce combined light energy having a luminosity varying as a sinusoidal function of said phase difference, and transforming said combined light energy into electrical energy to produce an electrical quantity varying as a sinusoidal function of said phase difference angle.

2. A method of generating an electrical quantity equal to a sinusoidal function of an angle proportional to a useful electrical magnitude, comprising the steps of generating a beam of monochromatic light energy, dividing said beam into two component beams of equal luminosity, directing said component beams along separate paths, varying the effective optical length of at least one of said paths by an amount equal to a plurality of wavelengths of the light energy and proportional to the said electrical magnitude, interfering said component beams to produce combined light energy having a luminosity varying as a sinusoidal function of an angle proportional to the length of the modulated optical path, and transforming said combined light energy into electrical energy to produce an electrical quantity varying as a sinusoidal function of said angle.

3. A device for generating an electrical quantity equal to a sinusoidal function of an angle proportional to a useful electrical quantity, which comprises means for generating two monochromatic light beams of constant and like luminosity, means to direct said beams along separate paths, means to vary the effective optical length of one of said paths by an amount greater than three-fourths of a wavelength of the light of said beams and proportional to said useful electrical magnitude to produce optical phase differences between said beams proportional to said electrical magnitude, means to combine said beams on emergence from said paths to produce an interference pattern of combined light energy comprising bands having a luminosity varying as a sinusoidal function of an angle proportional to the optical length of the modulated path, and photosensitive means to transform the light energy of one of said varying luminosity bands into electrical energy.

4. A device according to claim 3, in which the optical path varying means is an element of piezoelectric characteristics.

5. A device according to claim 3, in which the optical path varying means is a mirror displaceable in the direction of the corresponding light beam in response to said useful electrical quantity.

6. A device according to claim 3, in which said light beam combining means are arranged to produce an interference pattern having relatively wide bands, the said photosensitive means being provided with a plurality of photosensitive elements each located along the center line of similar bands.

7. A method of generating an electrical quantity equal to a sinusoidal function of an angle proportional to a useful electrical magnitude, which comprises the steps of generating a beam of monochromatic light, polarizing said beam, dividing the polarized beam by double refraction into two virtual component beams, varying the optical path length differently for each virtual beam by an amount greater than three-fourths of a wavelength of the monochromatic light and proportional to said electrical magnitude to produce an optical phase difference between said virtual beams proportional to said electrical magnitude, subjecting said virtual beams simultaneously to polarization in quadrature with the first mentioned polarization to produce an emerging interference beam the luminous intensity of which varies sinusoidally with said phase difference angle, and transforming said emerging beam into electrical energy.

8. A device for generating an electrical quantity equal to a sinusoidal function of an angle proportional to a useful electrical magnitude, which comprises means for generating a beam of monochromatic light of constant intensity, means to polarize the beam, an anisotropic section to split the polarized light beam into two virtual component beams and consisting of a member of crystalline, double refracting piezo-electric material, means to vary the optical length of said anisotropic section by an amount greater than three-fourths of a wave-length of the monochromatic light and proportional to said electrical magnitude, and an analyzer to combine said virtual component beams to produce a conversion zone of interferential luminous intensity, said conversion zone comprising photosensitive means to convert the interferential light energy of said zone into electrical energy varying as a sinusoidal function of said electrical magnitude.

9. A method of generating two electrical quantities representing conjugate sinusoidal functions of an angle proportional to a modulating potential, comprising the steps of generating two component light beams of constant and an equal luminosity, directing said component beams along separate paths, varying the effective length of one of said paths relative to the other by an amount greater than three-fourths of a wavelength of the light of said beams and proportional to said modulating potential, interfering said un-modulated and modulated component beams to produce an interference light pattern comprising at least two bands each having a luminosity decreasing and increasing, respectively, as two conjugate sinusoidal functions of an angle proportional to the length of the modulated optical path, and transforming the light energy of each of said bands into electrical energy to produce a first electrical quantity varying proportionally to a sinusoidal function of said angle and a second electrical quantity varying proportionally to the conjugate trigonometric function of said sinusoidal function.

FRANCISCO J. D'AGOSTINO.
S. A. VALDES.